(12) United States Patent
Ito et al.

(10) Patent No.: US 9,028,236 B2
(45) Date of Patent: May 12, 2015

(54) INJECTION MOLDING MACHINE INCLUDING AN EJECTOR UNIT

(71) Applicant: Sumitomo Heavy Industries, Ltd., Tokyo (JP)

(72) Inventors: Yosuke Ito, Chiba (JP); Akihisa Kobayashi, Chiba (JP); Hiroshi Yamaguchi, Chiba (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 0 days.

(21) Appl. No.: 14/133,883

(22) Filed: Dec. 19, 2013

(65) Prior Publication Data

US 2014/0178514 A1    Jun. 26, 2014

(30) Foreign Application Priority Data

Dec. 25, 2012  (JP) ................................ 2012-281566

(51) Int. Cl.
*B29C 45/40* (2006.01)
*B29C 45/76* (2006.01)

(52) U.S. Cl.
CPC ......... *B29C 45/7626* (2013.01); *B29C 45/4005* (2013.01)

(58) Field of Classification Search
CPC ................ B29C 45/7626; B29C 45/4005
USPC ........................................ 425/549, 139, 556
See application file for complete search history.

(56) References Cited

U.S. PATENT DOCUMENTS

| | | | |
|---|---|---|---|
| 3,726,625 A | | 4/1973 | Rees |
| 3,807,914 A | * | 4/1974 | Paulson et al. ................ 425/144 |
| 6,379,141 B1 | | 4/2002 | Kawasaki et al. |
| 6,616,872 B2 | * | 9/2003 | Kamiguchi et al. ......... 264/40.1 |
| 8,425,216 B2 | * | 4/2013 | Catoen .......................... 425/135 |
| 8,425,217 B2 | * | 4/2013 | Groleau ........................ 425/149 |
| 8,444,409 B2 | | 5/2013 | Eppich |
| 2001/0010172 A1 | | 8/2001 | Kawasaki et al. |
| 2005/0082708 A1 | | 4/2005 | Nishizawa |
| 2005/0238757 A1 | * | 10/2005 | Niewels et al. ............... 425/556 |
| 2008/0233227 A1 | | 9/2008 | Onishi et al. |
| 2009/0243131 A1 | * | 10/2009 | Tanaka et al. ................ 264/40.5 |
| 2011/0151041 A1 | * | 6/2011 | Groleau ........................ 425/139 |
| 2011/0177187 A1 | | 7/2011 | Nishimura et al. |
| 2013/0251837 A1 | * | 9/2013 | Takeuchi et al. .............. 425/150 |

FOREIGN PATENT DOCUMENTS

| | | |
|---|---|---|
| DE | 102010034451 | 3/2011 |
| EP | 1147874 | 10/2001 |
| EP | 1205291 | 5/2002 |
| GB | 1437735 | 6/1976 |
| JP | 04-168018 | 6/1992 |
| WO | WO 2005/068155 | 7/2005 |

OTHER PUBLICATIONS

Extended European Search Report dated Apr. 17, 2014.

* cited by examiner

*Primary Examiner* — Tim Heitbrink
(74) *Attorney, Agent, or Firm* — IPUSA, PLLC (57) ABSTRACT

An injection molding machine includes an ejector unit configured to eject a molding product from a mold and a mold release force sensor configured to detect a force to release the molding product from the mold.

4 Claims, 8 Drawing Sheets

INJECTION MOLDING MACHINE INCLUDING AN EJECTOR UNIT

CROSS-REFERENCE TO RELATED APPLICATIONS

This application is based upon and claims the benefit of priority of Japanese Patent Application No. 2012-281566, filed on Dec. 25, 2012. This application is also based upon Japanese Patent Application No. 2013-227060, filed on Oct. 31, 2013. The entire contents of the foregoing applications are incorporated herein by reference.

BACKGROUND

1. Technical Field

The present invention relates to injection molding machines.

2. Description of Related Art

Injection molding machines manufacture a molding product by filling the cavity space of a mold unit with molten resin and solidifying the molten resin. The mold unit includes a stationary mold and a movable mold, and the cavity space is formed between the stationary mold and the movable mode at the time of mold clamping. The molding product molded in the cavity space is ejected from the movable mold after mold opening. An ejector unit is used in this ejection.

SUMMARY

According to an aspect of the present invention, an injection molding machine includes an ejector unit configured to eject a molding product from a mold and a mold release force sensor configured to detect a force to release the molding product from the mold.

It is to be understood that both the foregoing general description and the following detailed description are exemplary and explanatory and not restrictive of the invention.

DETAILED DESCRIPTION

It is desirable to determine the state of mold release.

According to an aspect of the present invention, an injection molding machine capable of determining the state of mold release is provided.

A description is given below, with reference to the accompanying drawings, of embodiments of the present invention. In the drawings, the same or corresponding configurations are referred to by the same or corresponding reference numerals, and their description is omitted. Furthermore, in the following description, a direction in which a movable platen moves at the time of mold closing is referred to as "front or forward direction" and a direction in which the movable platen moves at the time of mold opening is referred to as "rear or backward direction."

Figure 1:
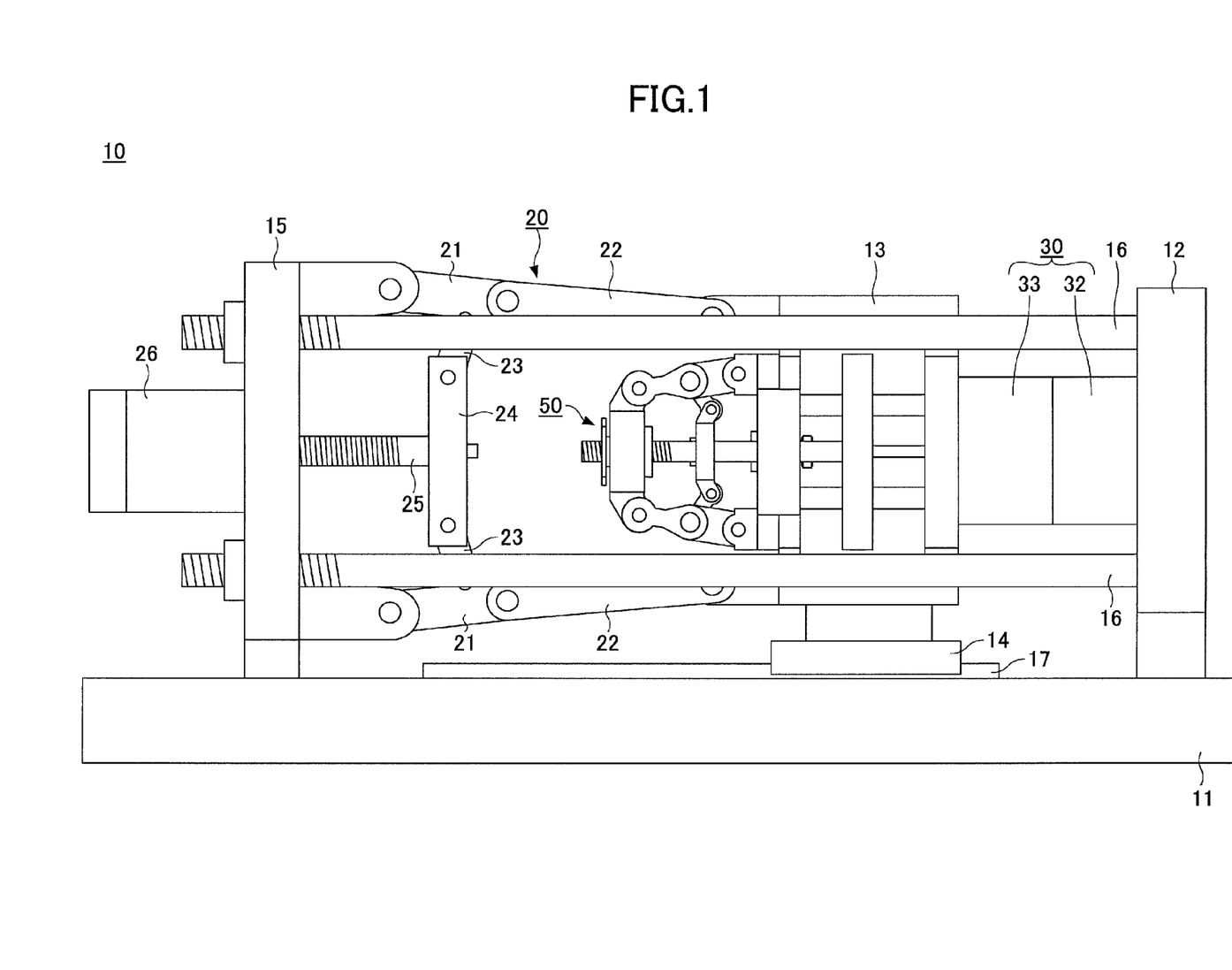
FIG. 1 is a schematic diagram illustrating an injection molding machine according to an embodiment.

FIG. 1 is a diagram illustrating the state of an injection molding machine at the time of completion of mold closing according to an embodiment of the present invention. Referring to FIG. 1, an injection molding machine 10 includes a frame 11, a stationary platen 12 fixed to the frame 11, and a rear platen 15 provided at a distance from the stationary platen 12. The stationary platen 12 and the rear platen 15 are connected by multiple (for example, four) tie bars 16. The tie bars 16 have their axial directions in the front and the rear direction. The rear platen 15 is provided so as to be movable relative to the frame 11 in order to allow extension of the tie bars 16 at the time of mold clamping.

The injection molding machine 10 further includes a movable platen 13 provided between the stationary platen 12 and the rear plate 15. The movable platen 13 is fixed to a pair of right and left sliders 14. The sliders 14 are movable in the front and the rear direction along guides 17 provided on the frame 11. This makes it possible for the movable platen 13 to come into and out of contact with the fixed platen 12. The movable platen 13 includes grooves at positions corresponding to the tie bars 16.

The movable platen 13 according to this embodiment, which includes grooves at positions corresponding to the tie bars 16, may alternatively include through holes in place of the grooves.

A movable mold 33 is attached to a surface of the movable platen 13 that faces the stationary platen 12, and a stationary mold 32 is attached to a surface of the stationary platen 12 that faces the movable platen 13. The stationary mold 32 and the movable mold 33 form a mold unit 30. When the movable platen 13 moves forward, the movable mold 33 and the stationary mold 32 come into contact so that mold closing is performed. Furthermore, when the movable platen 13 moves backward, the movable mold 33 and the stationary mold 32 come out of contact so that mold opening is performed.

The injection molding machine 10 further includes a toggle mechanism 20 provided between the movable platen 13 and the rear platen 15 and a mold clamping motor 26 that causes the toggle mechanism 20 to operate. The mold clamping motor 26 includes a ball screw mechanism as a motion conversion part that converts rotational motion into linear motion, and causes the toggle mechanism 20 to operate by causing a drive shaft to move forward and backward.

The toggle mechanism 20 includes a crosshead 24, first toggle levers 21, second toggle levers 23, and toggle arms 22. The crosshead 24 is movable back and forth in directions parallel to a mold opening direction (to open the molding apparatus 30) and a mold closing direction (to close the molding apparatus 30). The first toggle levers 21 are pivotably attached to the rear platen 15. The second toggle levers 23 are pivotably attached to the crosshead 24. The toggle arms 22 are pivotably attached to the movable platen 13. The first toggle levers 21 and the second toggle levers 23 are pin-connected, and the first toggle levers 21 and the toggle arms 22 are pin-connected. The toggle mechanism 20 is a so-called inward folding five-joint double toggle mechanism, and is symmetric with respect to its horizontal axis.

The stationary platen 12, the movable platen 13, the rear platen 15, the toggle mechanism 20, and the mold clamping motor 26 may form a mold clamping unit.

Figure 4:
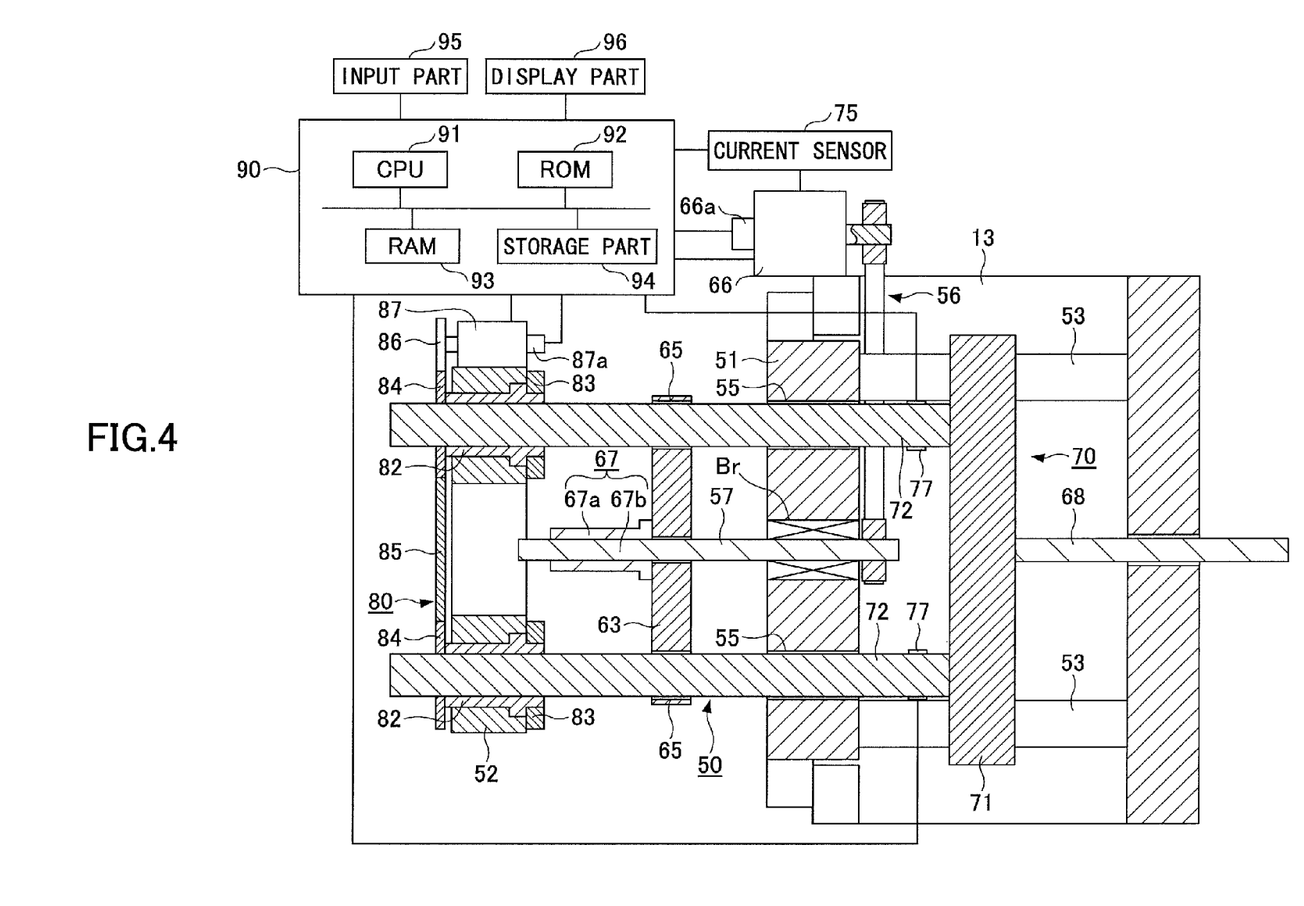
FIG. 4 is a cross-sectional view taken along a plane including line IV-IV in FIG. 2.

Next, a description is given of operations of the injection molding machine 10. The operations of a mold clamping unit, the operations of an injection unit, and the operations of an ejector unit are controlled by a controller 90 (FIG. 4). Referring to FIG. 4, the controller 90 includes a central processing unit (CPU) 91, a read-only memory (ROM) 92, a random access memory (RAM) 93, a storage part 94 such as a hard disk, an input interface, an output interface, a timer, and a counter. The controller 90 implements functions by causing the CPU 91 to execute a program stored in the ROM 92 or the storage part 94.

In a state where mold opening is completed, the toggle mechanism 20 is caused to operate by driving the mold clamping motor 26 in a forward direction to cause the crosshead 24 as a driven member to move forward. As a result, the movable platen 13 is caused to move forward, so that the movable mold 33 and the stationary mold 32 come into contact to complete mold closing as illustrated in FIG. 1.

Next, in response to further driving of the mold clamping motor 26 in the forward direction, the toggle mechanism 20 causes a mold clamping force, determined by multiplying a thrust caused by the mold clamping motor 26 by a toggle multiplying factor, to be generated. A cavity space (not graphically illustrated) is formed between the stationary mold 32 and the movable mold 33 in a clamped mold state. An injection unit fills the cavity space with molten resin, and the molten resin filling in the cavity space is solidified to become a molding product.

Next, when the mold clamping motor 26 is driven in a reverse direction to cause the crosshead 24 to move backward so that the toggle mechanism 20 is caused to operate, the movable platen 13 is caused to move backward, so that mold opening is performed. Thereafter, an ejector unit 50 ejects a molding product from the movable mold 33.

The mold clamping unit of this embodiment causes a mold clamping force to be generated using the toggle mechanism 20. Alternatively, a thrust generated by the mold clamping motor 26 may be directly transmitted to the movable platen 13 as a mold clamping force without using the toggle mechanism 20. Furthermore, a thrust generated by a mold clamping cylinder may also be directly transmitted to the movable platen 13 as a mold clamping force. Furthermore, mold opening and closing may be performed using a linear motor, and mold clamping may be performed using an electromagnet. There is no limitation on the form of the mold clamping unit.

Figure 2:
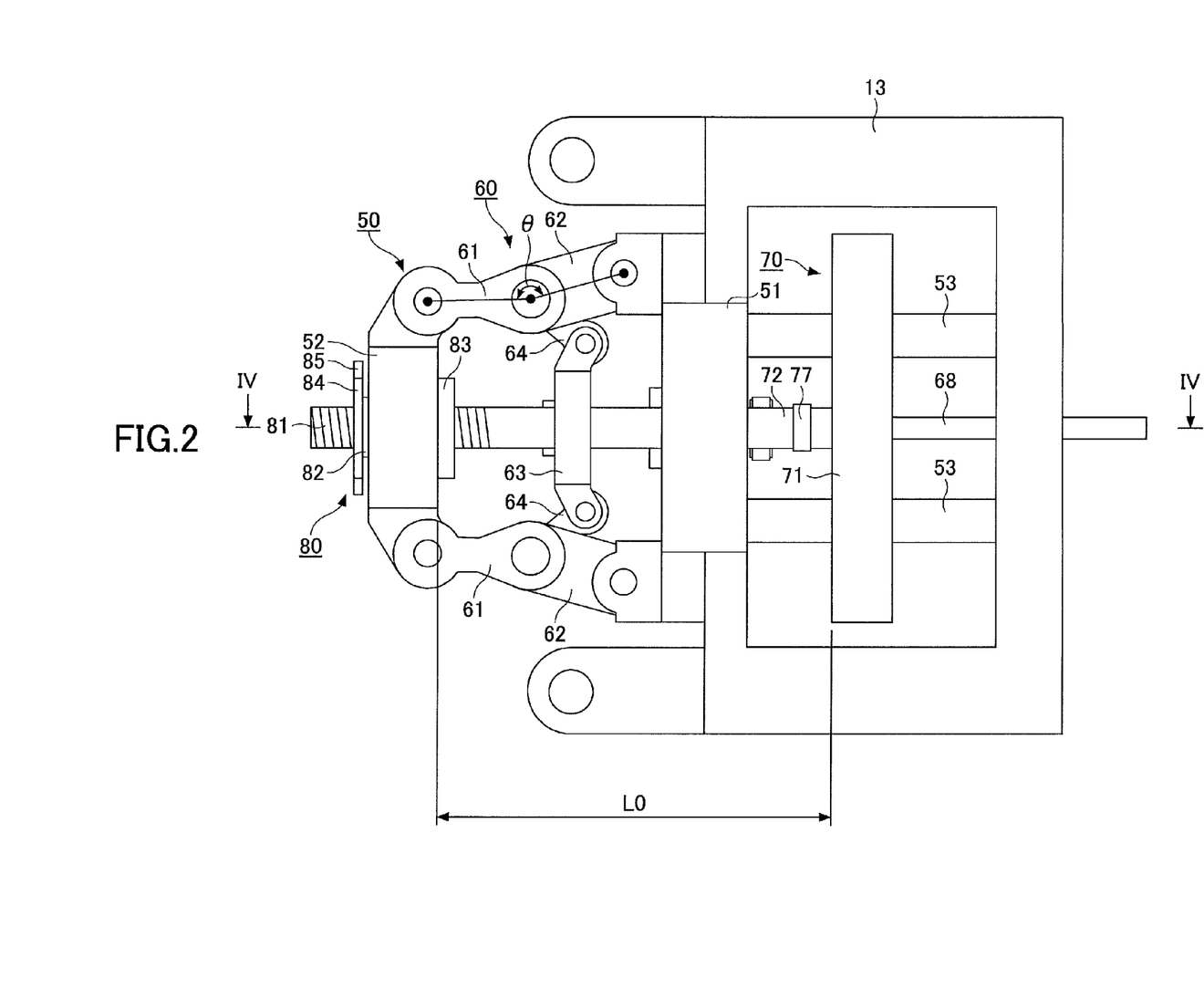
FIG. 2 is a diagram illustrating the state of an ejector unit at the start of ejection in a normal mode according to an embodiment of the present invention.
Figure 3:
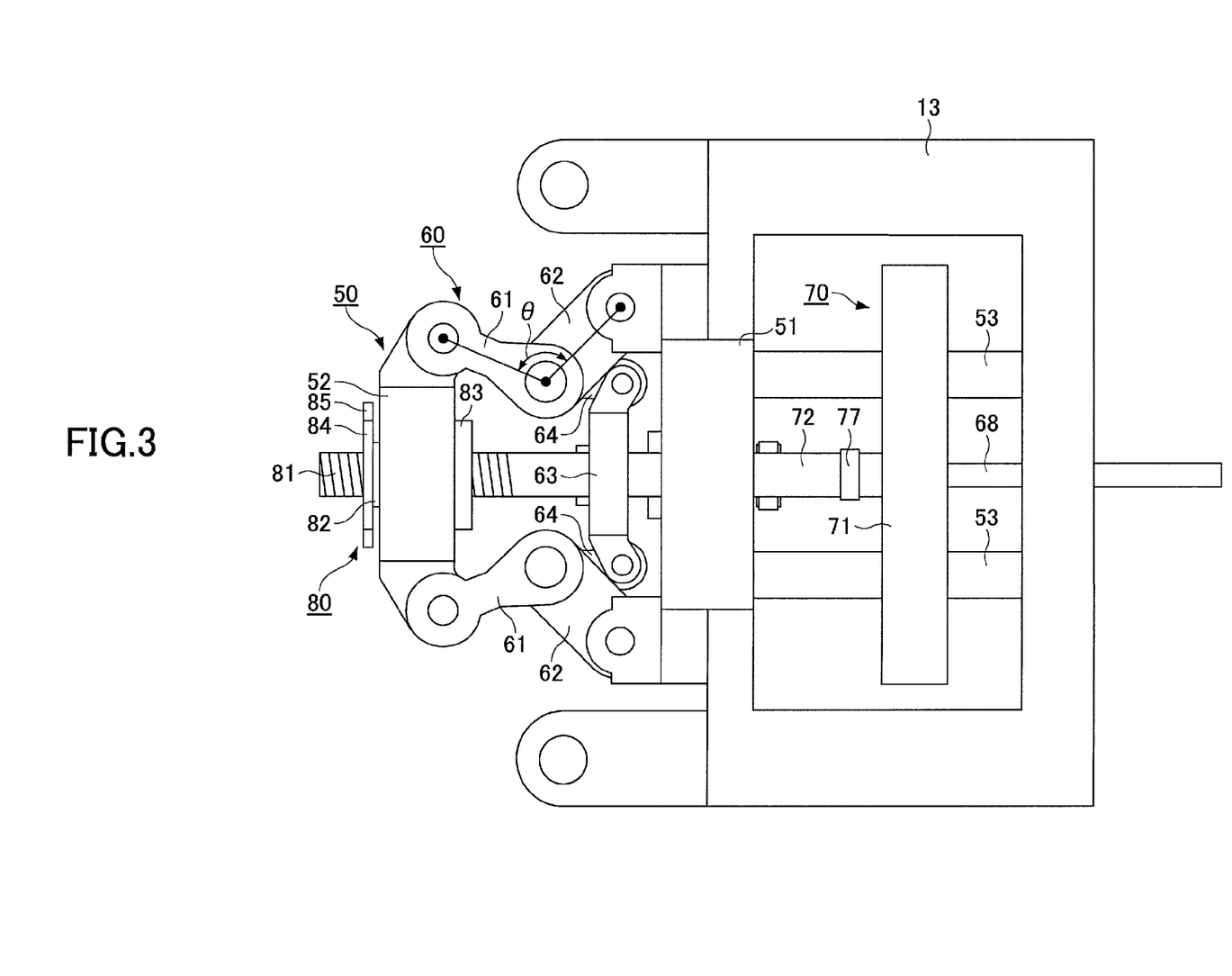
FIG. 3 is a diagram illustrating the state of an ejector unit at the completion of ejection in a normal mode according to an embodiment of the present invention.

FIG. 2 is a diagram illustrating the state of an ejector unit at the start of ejection in a normal mode according to an embodiment of the present invention. FIG. 3 is a diagram illustrating the state of an ejector unit at the completion of ejection in a normal mode according to an embodiment of the present invention. FIG. 4 is a cross-sectional view taken along a plane including line IV-IV in FIG. 2.

The ejector unit 50, which is used to eject a molding product from the movable mold 33, is provided on the movable platen 13. The ejector unit 50 includes an ejector toggle support 51 serving as a support, an ejector movable platen 52 serving as a slidable base, an ejector toggle mechanism 60 serving as a transmission mechanism, and an ejector motor 66 (FIG. 4) serving as a drive source.

The ejector toggle support 51, which supports the ejector toggle mechanism 60, is provided separately from the movable platen 13 and fixed to the movable platen 13 with bolts or the like. The ejector toggle support 51 may be provided as part of the movable platen 13. The ejector toggle support 51 includes attachment parts to which the ejector toggle mechanism 60 is attached.

The ejector movable platen 52 is movable back and forth relative to the ejector toggle support 51. The ejector movable platen 52 may be provided at a position more distant from the movable mold 33 (FIG. 1) than is the ejector toggle support 51. The ejector movable platen 52 includes attachment parts to which the ejector toggle mechanism 60 is attached.

The ejector toggle mechanism 60 converts an input (a thrust caused by the ejector motor 66, more specifically, the axial force of an ejector ball screw mechanism 67) into an output corresponding to the distance between the ejector toggle support 51 and the ejector movable platen 52 (an ejection force), and transmits the output to the ejector movable platen 52. The ejector toggle mechanism 60 is provided between the ejector toggle support 51 and the ejector movable platen 52.

As illustrated in FIG. 2 and FIG. 3, the ejector toggle mechanism 60 includes ejector toggle arms 61 and first ejector toggle levers 62. The ejector toggle arms 61 are pivotably attached to the ejector movable platen 52. The first ejector toggle levers 62 are pivotably attached to the ejector toggle support 51. The ejector toggle arms 61 and the first ejector toggle levers 62 are linked to be rotatable relative to each other about the linking positions.

The ejector toggle arms 61 and the first ejector toggle levers 62 may be interchanged. That is, the ejector toggle arms 61 may be pivotably attached to the ejector toggle support 51 and the first ejector toggle levers 62 may be pivotably attached to the ejector movable platen 52.

The ejector toggle mechanism 60 further includes an ejector crosshead 63 that is movable back and forth relative to the ejector toggle support 51, and second ejector toggle levers 64 pivotably attached to the ejector crosshead 63 and the first ejector toggle levers 62.

This ejector toggle mechanism 60 is a so-called inward folding five-joint double toggle mechanism, and is symmetric with respect to its horizontal axis. According to embodiments of the present invention, however, the ejector toggle mechanism 60 is not limited to this. For example, the ejector toggle mechanism 60 may be an outward folding toggle, a single toggle, or a four-joint toggle.

The ejector motor 66 is a drive source that causes the ejector toggle mechanism 60 to operate. The ejector motor 66 is provided on, for example, the movable platen 13. The position at which the ejector motor 66 is provided is not limited in particular, and may be, for example, the ejector toggle support 51 or the ejector movable platen 52.

The ejector motor 66 may include an encoder part 66*a* that detects the rpm of the output shaft of the ejector motor 66. Furthermore, a current sensor 75 that detects an electric current supplied to the ejector motor 66 may be connected to the ejector motor 66.

The rotational motion of the ejector motor 66 is converted into linear motion in the ejector ball screw mechanism 67 to be transmitted to the ejector toggle mechanism 60. The ejector ball screw mechanism 67 includes, for example, an ejector ball screw nut 67a fixed to the ejector crosshead 63, and an ejector ball screw shaft 67b mating with the thread of the ejector ball screw nut 67a. A rotating shaft 57 that coaxially extends forward from the ejector ball screw shaft 67b is attached to the ejector toggle support 51 via a bearing Br so as to be rotatable and prevented from moving back and forth relative to the ejector toggle support 51. The rotating shaft 57 is connected to the output shaft of the ejector motor 66 via a connecting member 56 including a belt and pulleys. When the output shaft of the ejector motor 66 rotates, the ejector ball screw shaft 67b rotates, so that the ejector ball screw nut 67a and the ejector crosshead 63 move toward or away from the movable mold 33.

The rotating shaft 57, which is connected to the output shaft of the ejector motor 66 via the connecting member 56 according to this embodiment, may alternatively be directly connected to the output shaft of the ejector motor 66.

When the ejector toggle mechanism 60 is caused to operate by driving the ejector motor 66 in a forward direction to cause the ejector crosshead 63 to move toward the movable mold 33, the ejector movable platen 52 is caused to move toward the movable mold 33. On the other hand, when the ejector toggle mechanism 60 is caused to operate by driving the ejector motor 66 in a reverse direction to cause the ejector crosshead 63 to move away from the movable mold 33, the ejector movable platen 52 is caused to move away from the movable mold 33.

An ejection member 70 is a member that moves together with the ejector movable platen 52. The ejection member 70 includes, for example, an ejector plate 71, ejector tie bars 72, and an ejector rod 68.

The ejector plate 71 may be provided at a position closer to the movable mold 33 than is the ejector toggle support 71. For example, the ejector plate 71 may be provided inside the movable platen 13. Guide holes for inserting guide bars 53 are formed in the ejector plate 71, so that the ejector plate 71 is movable back and forth along the guide bars 53. The guide bars 53 have respective rear end portions fixed to the ejector toggle support 51 and have respective front end portions fixed to the movable platen 13. The guide bars 53 may have their front end portions or rear end portions alone fixed to a corresponding one of the movable platen 13 and the ejector toggle support 51.

The ejector tie bars 72 are members that connect the ejector plate 71 and the ejector movable platen 52 at a distance from each other. A mold release force sensor 77 is provided around each of the ejector tie bars 72. The mold release force sensors 77 detect a mold release force by detecting the deformation of the ejector tie bars 72 caused by the release of a molding product from the movable mold 33. The mold release force, which refers to a force to cause a molding product to be released from the movable mold 33, is generated when a molding product adhering to the movable mold 33 is pushed in an ejection direction in which the molding product is ejected. No mold release force is generated even by driving the ejector motor 66 before the molding product is pushed in the ejection direction. In the case where the movable mold 33 is divided to facilitate extraction of a molding product, the mold release force includes a force to cause part of the movable mold 33 to slide relative to the rest of the movable mold 33.

Thus, according to this embodiment, because the mold release force sensors 77 detect a mold release force, it is possible to determine the state of mold release. The detection result of the mold release force sensors 77 is monitored by the controller 90. The controller 90 may correspond to a monitoring part. The controller 90 may determine the operating state of the ejector unit 50 based on the monitoring result.

The tie bars 72 may be provided with their respective mold release force sensors 77, which may detect forces that are simultaneously applied to the ejector tie bars 72 when the ejector motor 66 is driven. This makes it possible to check the balance of the ejector tie bars 72. For example, it is possible to determine whether the balance is good or not based on whether or not the difference between the maximum value and the minimum value of the forces simultaneously applied to the ejector tie bars 72 is less than or equal to a predetermined value.

The mold release force sensors 77, which are composed of deformation sensors provided around the ejector tie bars 72 according to this embodiment, may alternatively be composed of, for example, load cells provided between the ejector tie bars 72 and the ejector plate 71 so as to be compressed when a molding product is released from the movable mold 33. The mold release force sensors 77 are not limited to particular kinds. Furthermore, the positions at which the mold release force sensors 77 are provided are not limited in particular as long as the mold release force sensors 77 are provided on a member driven by the ejector motor 66, which may be, for example, the ejector toggle mechanism 60, the ejector ball screw mechanism 67, the ejector movable platen 52, or the ejector rod 68.

The ejector tie bars 72 are inserted into corresponding guide holes 55 of the ejector toggle support 51 so as to be movable back and forth along the guide holes 55. As many guide holes 55 as the number of the ejector tie bars 72 (for example, two) may be provided. This makes it possible to prevent the ejector movable platen 52 from rotating about a front-rear direction as an axis.

The ejector tie bars 72 are inserted into corresponding guide holes 65 of the ejector crosshead 63, so that the ejector crosshead 63 is movable back and forth along the ejector tie bars 72. As many guide holes 65 as the number of the ejector tie bars 72 (for example, two) may be provided. This makes it possible to prevent the ejector crosshead 63 from rotating about a front-rear direction as an axis.

A rear end portion of the ejector rod 68 is fixed to the ejector plate 71. A front end portion of the ejector rod 68 may be connected to a molding product ejecting member (not graphically illustrated) provided in the movable mold 33 (FIG. 1). When the ejector rod 68 is caused to move forward, the molding product ejecting member releases a molding product from the movable mold 33. Thereafter, when the ejector rod 68 is caused to further move forward, the molding product ejecting member conveys the molding product to an extraction position. When the ejector rod 68 is caused to move backward after extraction of the molding product, the molding product ejecting member returns to its original position. Multiple ejector rods may be fixed to the ejector plate 71.

The ejection member 70 stays at an ejection start position (the position illustrated in FIG. 2) in a mold closing process and a mold clamping process, and moves forward from the ejection start position to an ejection completion position (the position illustrated in FIG. 3) after a mold opening process. The ejection start position of the ejection member 70 is determined by the shape of the movable mold 33, etc., and does not depend on the modes described below. After extraction of a molding product by an extractor, the ejection member 70 returns to the ejection start position.

The ejection member 70 may start its forward movement during the mold opening process in order to shorten a molding cycle.

While causing the ejection member 70 to move toward or away from the movable mold 33, the controller 90 monitors the position of the ejection member 70 relative to the movable mold 33, and supplies the ejector motor 66 with an electric current corresponding to the monitoring result. The position of the ejection member 70 relative to the movable mold 33 may be calculated from, for example, the detection result of the encoder part 66a of the ejector motor 66. Furthermore, the controller 90 monitors the torque of the ejector motor 66. The torque of the ejector motor 66 may be calculated from, for example, the detection result of the current sensor 75.

Figure 5:
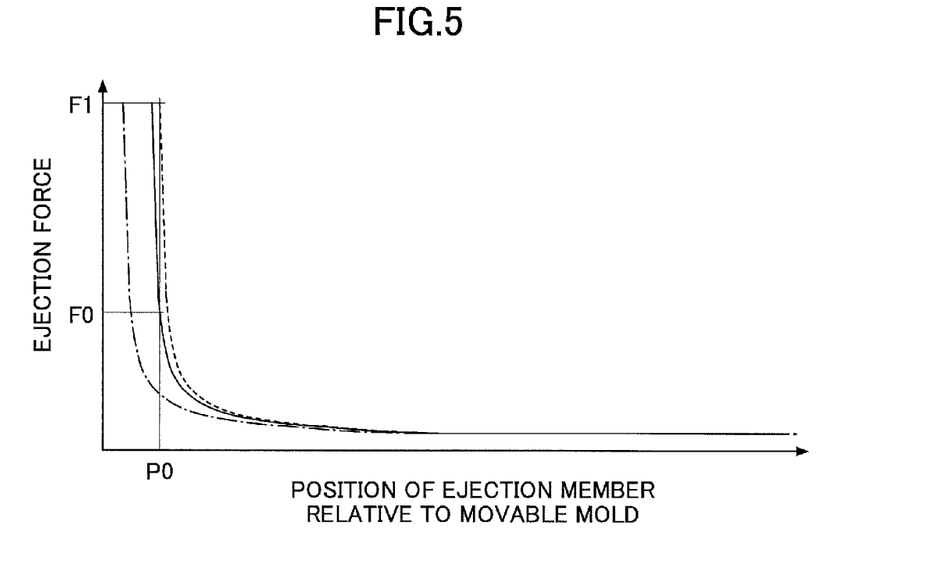
FIG. 5 is a diagram illustrating the relationship between the ejection force of an ejector unit and the position of an ejection member relative to a movable mold according to an embodiment of the present invention.
Figure 6:
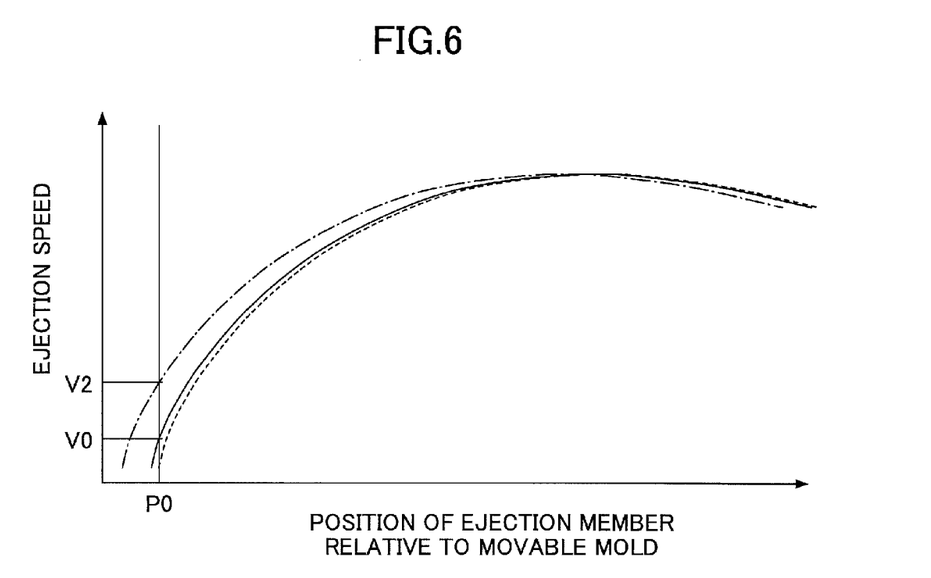
FIG. 6 is a diagram illustrating the relationship between the ejection speed of an ejector unit and the position of an ejection member relative to a movable mold according to an embodiment of the present invention.

FIG. 5 is a diagram illustrating the relationship between the ejection force of an ejector unit and the position of an ejection member relative to a movable mold according to an embodiment of the present invention. The ejection force refers to a thrust to cause the ejector movable platen 52 and the ejection member 70 to move forward. In FIG. 5, the driving force of the ejector motor 66 is constant, and the electric current supplied to the ejector motor 66 is constant. FIG. 6 is a diagram illustrating the relationship between the ejection speed of an ejector unit and the position of an ejection member relative to a movable mold according to an embodiment of the present invention. The ejection speed refers to a speed at which the ejection member 70 moves forward. In FIG. 6, the rpm of the ejector motor 66 is constant. In FIG. 5 and FIG. 6, a solid line indicates an ejection characteristic in a normal mode, a dot-chain line indicates an ejection characteristic in a high-output mode, and a broken line indicates an ejection characteristic in a high-speed mode. Before giving a description of each mode, a description is given of the relationship between the ejection characteristics of the ejector unit 50 and the position of the ejection member 70 relative to the movable mold 33.

In this embodiment, as illustrated in FIG. 2 through FIG. 4, the ejector movable platen 52 is provided at a position more distant from the movable mold 33 than is the ejector toggle support 51. Accordingly, when the ejection member 70 moves forward from the ejection start position, the distance between the ejector movable platen 52 and the ejector toggle support 51 is reduced, so that an angle θ between the centerline of each ejector toggle arm 61 and the centerline of the corresponding first ejector toggle lever 62 linked to the ejector toggle arm 61 is reduced. Accordingly, the ejection characteristics change with the forward movement of the ejection member 70 as illustrated in FIG. 5 and FIG. 6.

As illustrated in FIG. 5, in each mode, the ejection force suddenly decreases when the ejection member 70 starts to move forward from the ejection start position. Thereafter, while remaining substantially unchanged, the ejection force gradually decreases and then gradually increases with the forward movement of the ejection member 70.

Furthermore, as illustrated in FIG. 6, in each mode, when the ejection member 70 starts to move from the ejection start position, the ejection speed suddenly increases. Thereafter, with the forward movement of the ejection member 70, the ejection speed gradually increases and then gradually decreases.

Thus, the ejection characteristics of the ejector unit 50 change in accordance with the position of the ejection member 70 relative to the movable mold 33, that is, the distance between the ejector toggle support 51 and the ejector movable platen 52. According to this embodiment, at the start of ejection, the ejection force is large because of a low ejection speed, so that a molding product is easy to release. Furthermore, after the release of a molding product, the ejection speed is high, so that it is possible to quickly convey the molding product to the extraction position.

Next, a description is given of an adjustment mechanism 80 that adjusts the ejection characteristics of the ejector unit 50. The adjustment mechanism 80 adjusts the position of the ejector movable platen 52 relative to the ejection member 70. The adjustment mechanism 80 may adjust the position of the ejector movable platen 52 relative to the movable mold 33 (that is, the angle θ between the centerline of each ejector toggle arm 61 and the centerline of the corresponding first ejector toggle lever 62) while having the position of the ejection member 70 relative to the movable mold 33 fixed to a predetermined position (for example, the ejection start position). Alternatively, the adjustment mechanism 80 may adjust the position of the ejection member 70 relative to the movable mold 33 while having the position of the ejector movable platen 52 relative to the movable mold 33 fixed to a predetermined position (that is, having the angle θ between the centerline of each ejector toggle arm 61 and the centerline of the corresponding first ejector toggle lever 62 fixed to a predetermined angle). Furthermore, the adjustment mechanism 80 may also adjust both the position of the ejection member 70 relative to the movable mold 33 and the position of the ejector movable platen 52 relative to the movable mold 33 simultaneously. The adjustment mechanism 80 may also adjust the position of the ejection member 70 relative to the ejector movable platen 52 so that the position of the ejection member 70 relative to the movable mold 33 is caused to be a predetermined position when the above-mentioned angle θ is caused to be a predetermined angle (that is, the position of the ejector crosshead 63 relative to the ejector toggle support 51 is caused to be a predetermined position) by driving the ejector motor 66.

For example, the adjustment mechanism 80 adjusts the distance between the ejector plate 71 and the ejector movable platen 52. The adjustment mechanism 80 includes, for example, a screw part 81 formed on an end portion of each of the ejector tie bars 72 and an adjusting nut 82 mated with the screw part 81. Multiple adjusting nuts 82 are provided in correspondence to the multiple ejector tie bars 72. The adjusting nuts 82 are rotatably attached to the ejector movable platen 52. As illustrated in FIG. 4, the adjusting nuts 82 are prevented from moving forward or backward relative to the ejector movable platen 52 by the ejector movable platen 52 and nut retainers 83. By rotating the adjusting nuts 82 relative to the corresponding screw parts 81, the position of the ejector movable platen 52 relative to the ejector tie bars 72 is adjusted, so that the distance between the ejector plate 71 and the ejector movable platen 52 is adjusted.

The adjusting nuts 82, which are rotatably attached on the ejector movable platen 52 side according to this embodiment, may alternatively be rotatably attached on the ejector plate 71 side to be prevented from moving forward or backward relative to the ejector plate 71.

The adjustment mechanism 80 further includes adjusting gears 84 that rotate together with the adjusting nuts 82, an intermediate gear 85 that causes the adjusting gears 84 to synchronously rotate, a driving gear 86 meshed with one of the adjusting gears 84, and an adjusting motor 87 that causes the driving gear 86 to rotate. The adjusting motor 87 may be a servomotor and includes an encoder 87a that detects the rpm of the output shaft of the adjusting motor 87. The adjusting motor 87 is subjected to feedback control based on the detection result of the encoder 87a. When the driving gear 86 is caused to rotate by driving the adjusting motor 87, the adjusting nuts 82 are caused to synchronously rotate.

According to this embodiment, the adjusting gears 84 are caused to synchronously rotate. Alternatively, the intermediate gear 85 may be removed to allow the adjusting gears 84 to independently rotate in order to achieve a balance between the ejector tie bars 72. For example, at least one of the adjusting gears 84 may be caused to rotate so that the difference between the maximum value and the minimum value of the forces simultaneously applied to the ejector tie bars 72 falls within a predetermined range.

On condition that the position of the ejector plate 71 relative to the movable mold 33 remains the same, the longer the distance between the ejector plate 71 and the ejector movable platen 52 is, the greater the angle θ between the centerline of each ejector toggle arm 61 and the centerline of the corresponding first ejector toggle lever 62 is, and accordingly, the larger the ejection force is because of a lower ejection speed.

Figure 7:
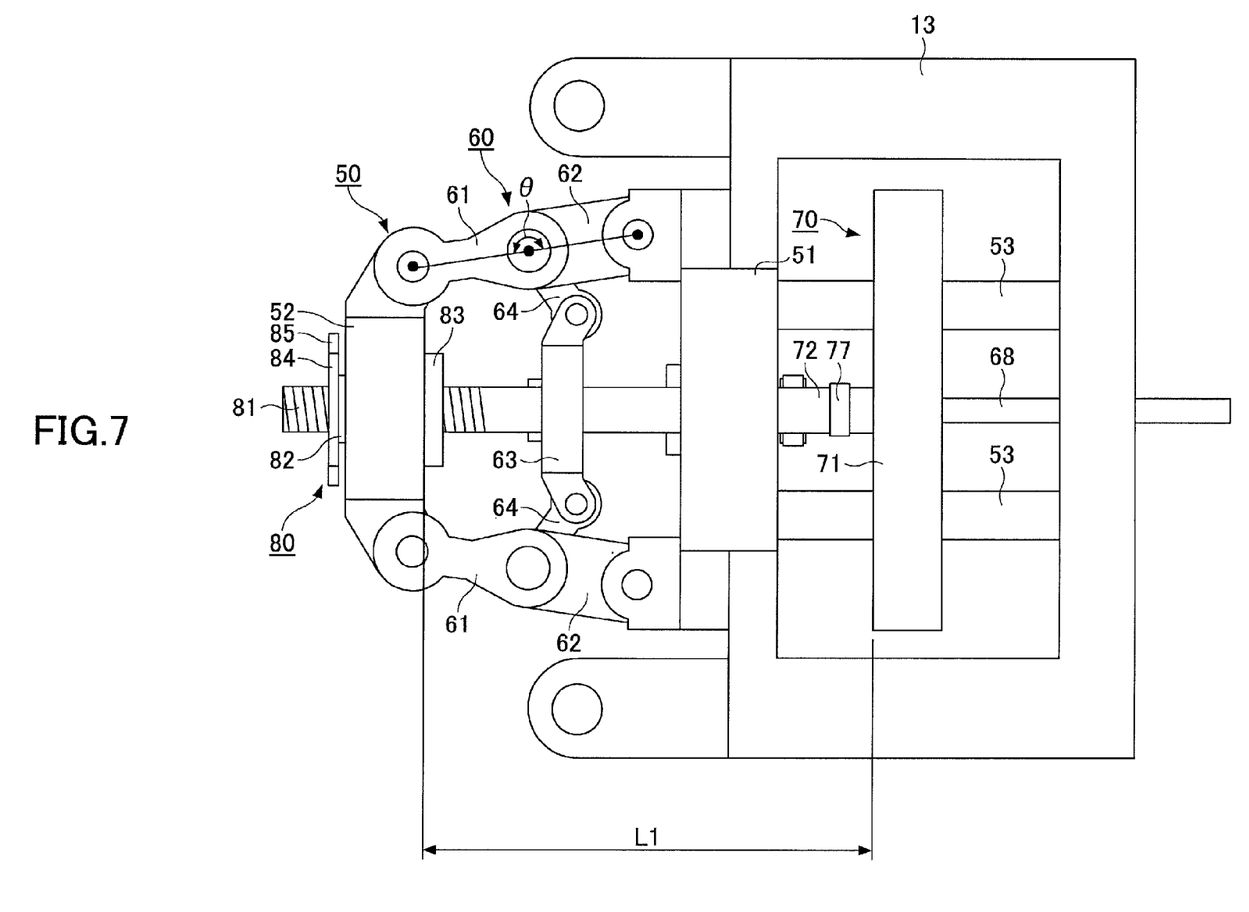
FIG. 7 is a diagram illustrating the state of an ejector unit at the start of ejection in a high-output mode according to an embodiment of the present invention.
Figure 8:
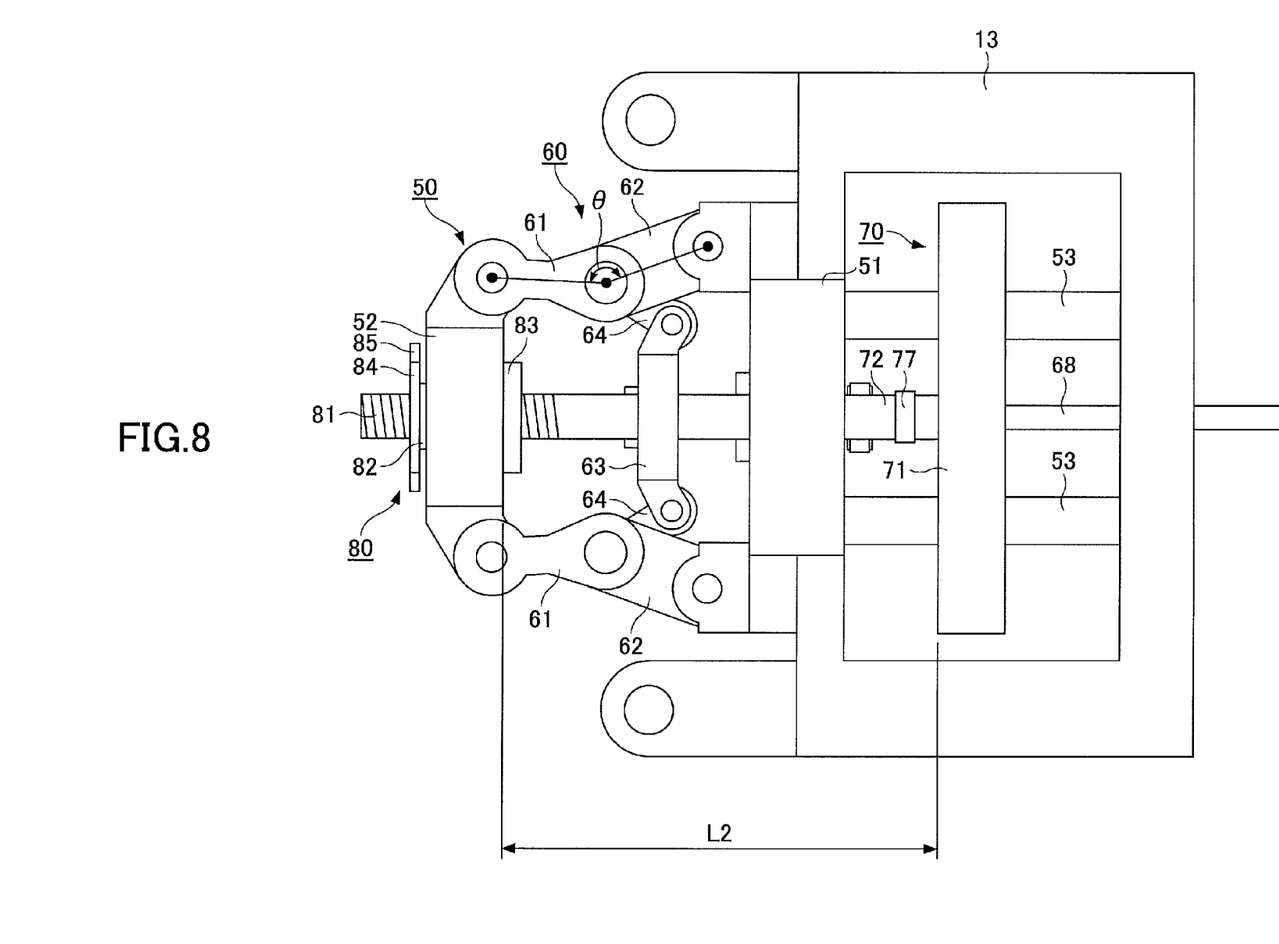
FIG. 8 is a diagram illustrating the state of an ejector unit at the start of ejection in a high-speed mode according to an embodiment of the present invention.

Accordingly, by adjusting the position of the ejector movable platen 52 relative to the ejection member 70, it is possible to adjust the ejection characteristics of the ejector unit 50 at the time when the ejection member 70 is at a predetermined position relative to the movable mold 33 (for example, the ejection start position). For example, increasing the distance between the ejector plate 71 and the ejector movable platen 52 from a distance L0 (FIG. 2) in the normal mode to a distance L1 (FIG. 7) in the high-output mode increases the ejection force at an ejection start position P0 from F0 to F1 as illustrated in FIG. 5, thus making it possible to strongly push a molding product at the start of ejection. Furthermore, decreasing the distance between the ejector plate 71 and the ejector movable platen 52 from the distance L0 in the normal mode to a distance L2 (FIG. 8) in the high-speed mode increases the ejection speed at the ejection start position P0 from V0 to V2 as illustrated in FIG. 6, thus making it possible to shorten a molding cycle.

According to this embodiment, the ejection characteristics at the time when the ejection member 70 is at the ejection start position are adjusted. Alternatively, the ejection characteristics at a time when the ejection member 70 is at a position other than the ejection start position (for example, a position close to the ejection completion position) may be adjusted.

The controller 90 has multiple optional positions for the position of the ejector movable platen 52 relative to the ejection member 70 (for example, the position illustrated in FIG. 2, the position illustrated in FIG. 7, and the position illustrated in FIG. 8) stored in the storage part 94 (FIG. 4), and selects a predetermined one of the optional positions (a predetermined optional position) when a predetermined condition is satisfied. The optional positions stored in the storage part 94 may be updated in accordance with operations input at an input part 95 (FIG. 4) that receives operations input by users.

After selecting a predetermined optional position, the controller 90 performs such control as to match the actual position with the selected optional position. Before matching the positions, the controller 90 may display a confirmation message on a display part 96 (FIG. 4). When a user who has seen the confirmation message displayed on the display part 96 performs a predetermined operation on the input part 95, the matching of the positions is performed. The position of the ejector movable platen 52 relative to the ejection member 70 may be measured based on, for example, the detection result of the encoder 87a that detects the rpm of the output shaft of the adjusting motor 87.

The input part and the display part 96, which are separately provided according to this embodiment, may alternatively be provided as a unit and be formed of a touchscreen panel.

The controller 90 may monitor the detection result of the mold release force sensors 77 and select one of the optional positions based on the monitoring result.

For example, the controller 90 may detect, based on the monitoring result, whether the ejection member 70 is stationary when the ejector motor 66 is driven in the ejection direction (the forward direction). When the mold release force exceeds a threshold, a molding product is firmly adhering to the movable mold 33, so that it may be determined that the ejection member 70 is stationary. Examples of the threshold include an actual value at the time when there is no abnormality in the ejector unit 50 and an estimated value predicted from the specifications of the ejector unit 50 and the specifications of the mold unit 30. The controller 90 may select the position in the normal mode in the case of a normal state where the ejection member 70 does not become stationary, and may select the position in the high-output mode in the case of an emergency state where the ejection member 70 becomes stationary.

Whether the ejection member 70 is stationary may be determined by (a) the position of a driven member driven by the ejector motor 66 (for example, the ejection member 70 or the ejector movable platen 52) in addition to the detection result of the mold release force sensors 77. It may be determined that the driven member is stationary when there is no substantial change in the position of the driven member for a predetermined period time while the ejector motor 66 is driven. The position of the driven member may be calculated from, for example, the detection result of the encoder part 66a of the ejector motor 66.

Whether the ejection member 70 is stationary may alternatively be determined by (b) the torque of the ejector motor 66 in addition to the detection result of the mold release force sensors 77. When the torque of the ejector motor 66 becomes higher than or equal to a predetermined value for a predetermined period of time, a large force is required to cause the driven member to move forward and a molding product is firmly adhering to the movable mold 33, so that it may be determined that the ejection member 70 is stationary. The torque of the ejector motor 66 may be calculated from, for example, the detection result of the current sensor 75.

Whether the ejection member 70 is stationary may alternatively be determined by (c) the driving time of the ejector motor 66 in addition to the detection result of the mold release force sensors 77. When the ejection of a molding product is not completed when the driving time of the ejector motor 66 reaches a predetermined time, the ejection takes too much time, so that it may be determined that the ejection member 70 is stationary. The driving time of the ejector motor 66 may be measured by, for example, the timer of the controller 90.

Whether the ejection member 70 is stationary may alternatively be determined based on two or more elements selected from the four elements of (a) the position of a driven member, (b) the torque of the ejector motor 66, and (c) the driving time of the ejector motor 66, in addition to the detection result of the mold release force sensors 77. This increases the accuracy of the determination. How the elements are combined and the number of elements to be combined are not limited in particular.

In the case of the emergency state where the ejection member 70 becomes stationary, the controller 90 may drive the ejector motor 66 in the reverse direction to cause the ejection member 70 to temporarily move (backward) away from the movable mold 33. Thereafter, the controller 90 drives the adjusting motor 87 to match the position of the ejector movable platen 52 relative to the ejection member 70 with the position in the high-output mode. After matching the positions, the controller 90 may drive the ejector motor 66 in the forward direction to cause the ejection member 70 to move (forward) toward the movable mold 33.

Furthermore, in the case of the emergency state where the ejection member 70 becomes stationary, the controller 90 may alternatively match the position of the ejector movable platen 52 relative to the ejection member 70 with the position in the high-output mode without changing the position of the ejection member 70 relative to the movable mold 33. In this matching of the positions, the adjusting motor 87 is driven to increase the distance between the ejector movable platen 52 and the ejector plate 71. At this point, because the ejector plate 71 is prevented from moving forward, the ejector movable platen 52 moves backward. The ejector motor 66 is caused to rotate in the reverse direction for an amount corresponding to the backward movement of the ejector movable platen 52. After the matching of the positions, the controller 90 may drive the ejector motor 66 in the forward direction to cause the ejection member 70 to move toward the movable mold 33.

Instead of matching the position of the ejector movable platen 52 relative to the ejection member 70 with the position in the high-output mode, the controller 90 may match the position of the ejector movable platen 52 relative to the ejection member 70 with a position located further backward from the position in the high-output mode. As illustrated in FIG. 5, depending on the position at which the ejection member 70 is stationary, there is little difference in the ejection force between modes, so that there may not be a sufficient increase in the ejection force due to a mode change. The ejector movable platen 52 may be caused to move backward relative to the ejection member 70 to a position where the ejection force becomes a predetermined value.

The controller 90 may control the adjustment mechanism 80 based on the result of monitoring a mold release force. For example, when the mold release force is smaller than a value predetermined by a test or the like, the ejection force is sufficiently large. Therefore, the controller 90 may perform such control as to reduce the distance between the ejector plate 71 and the ejector movable platen 52 so that the ejection speed (mold release speed) increases. This makes it possible to optimize the ejection characteristics and reduce a molding cycle. Furthermore, when the mold release force changes over time to be out of a predetermined range, the controller 90 may perform such control as to adjust the distance between the ejector plate 71 and the ejector movable platen 52 to vary the ejection force in accordance with the change in the mold release force. The controller 90 may monitor both of the mold release force and the mold release speed. The mold release speed may be measured based on, for example, the detection result of the encoder part 66a of the ejector motor 66. Alternatively, the mold release speed may be measured with a speed sensor (not graphically illustrated) that detects the speed of the ejection member 70 or the ejector movable platen 52. When the mold release speed is lower than or equal to a predetermined value, such as when the ejection member 70 becomes stationary, the controller 90 may control the adjustment mechanism 80 so that the ejection force increases.

The display part 96 may display the detection results of the mold release force sensors 77. The display on the display part 96 is controlled by, for example, the controller 90, and is switched in accordance with an input operation on the input part 95. The detection results of the mold release force sensors 77 displayed on the display part 96 may include the transition of the mold release force and the history of the mold release force. The transition of the mold release force may be either the transition of the mold release force in the current shot or the transition of the mold release force in past shots. As the history of the mold release force, for example, the mold release force at a predetermined position (for example, the ejection start position), the maximum value of the mold release force, the average of the mold release force, the minimum value of the mold release force, and the standard deviation of the mold release force are displayed shot by shot for multiple shots.

The controller 90 may control at least part of the ejecting operation of the ejector unit 50 based on the detection result of the mold release force sensors 77. This prevents an excessive force from being applied to the molding product ejecting member provided inside the mold unit 30 and the ejection member 70.

Figure 9:
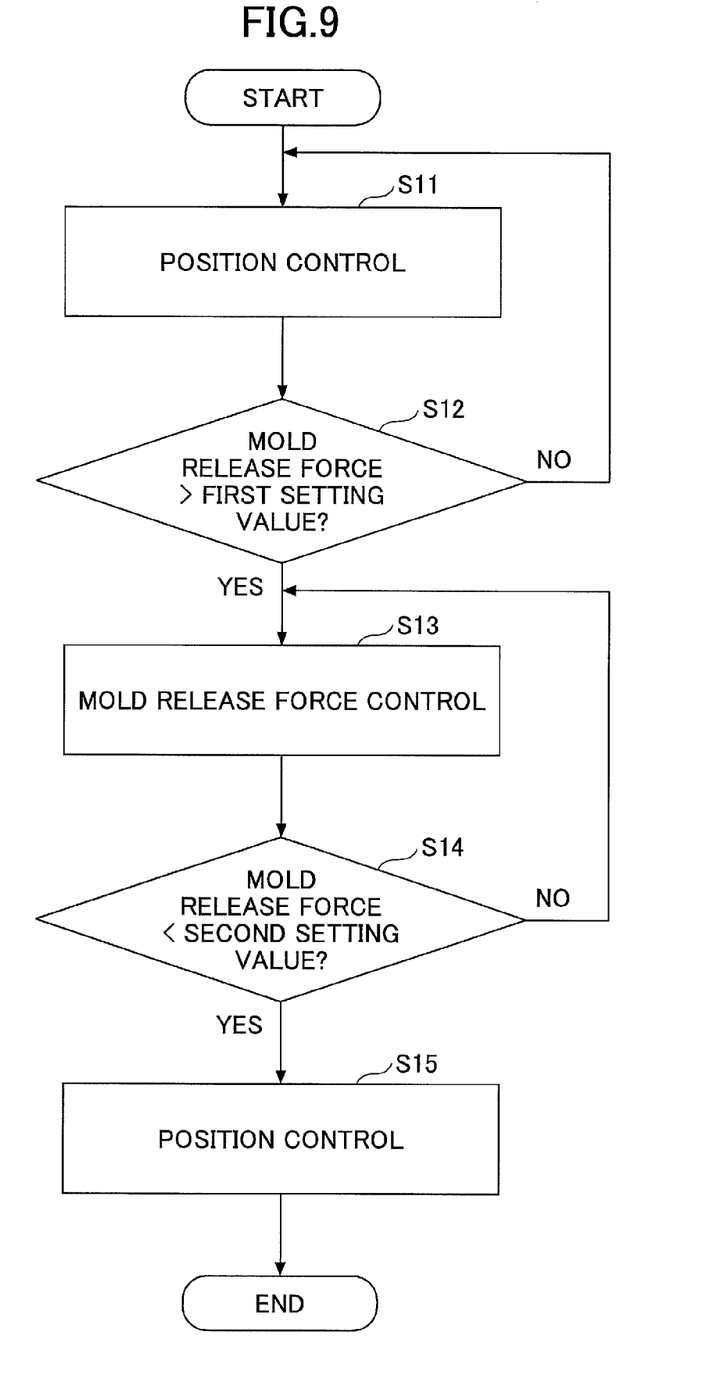
FIG. 9 is a flowchart illustrating control of an ejecting operation of an ejector unit according to an embodiment of the present invention.

Next, a description is given, with reference to FIG. 9, of the ejecting operation of the ejector unit 50. FIG. 9 is a flowchart illustrating control of an ejecting operation of an ejector unit according to an embodiment of the present invention.

The controller 90 drives the ejector motor 66 to start an ejecting operation. First, at step S11, the controller 90 performs position control to perform feedback control on the ejector motor 66 so that the ejection member 70 is positioned at a target position. The position of the ejection member 70 may be monitored using the encoder part 66a of the ejector motor 66 or may be monitored using a dedicated position sensor, for example. The target position of the ejection member 70 may change or may not change with the passage of time.

The controller 90 monitors a mold release force with the mold release force sensors 77 during the position control. The mold release force rises with the forward movement of ejection member 70.

At step S12, the controller 90 determines whether the mold release force is greater than a first setting value. The position control is performed while the mold release force is less than or equal to the first setting value (NO at step S12). On the other hand, if the mold release force exceeds the first setting value (YES at step S12), the controller 90 determines that mold release has started, and at step S13, performs mold release force control to perform feedback control on the ejector motor 66 so that the mold release force becomes a target value. The target value of the mold release force may change or may not change with the passage of time. The target value of the mold release force is greater than the first setting value.

While the mold release force is used in this embodiment, the position of the ejection member 70 may alternatively be used to determine whether to switch from the position control to the mold release force control. When the ejection member 70 is at a predetermined position or is positioned backward relative to the predetermined position, it is determined that mold release has not yet started, so that the position control continues to be performed. On the other hand, when the ejection member 70 is positioned forward relative to the predetermined position, it is determined that mold release has started, so that the mold release force control is performed instead of the position control. Both the position of the ejection member 70 and the mold release force may be used to determine whether to switch from the position control to the mold release force control.

The controller 90 monitors the mold release force with the mold release force sensors 77 during the mold release force control. When the ejection member 70 moves forward to some extent, a molding product is separated from the mold, so that the mold release force falls short of the target value.

At step S14, the controller 90 determines whether the mold release force is less than a second setting value. If the mold release force is greater than or equal to the second setting value (NO at step S14), the molding product is adhering to the mold. Therefore, the mold release force control continues to be performed. The second setting value is so determined as to prevent the mold release force from being caused to exceed the target value by the switching from the mold release force control to the position control, and is determined to be smaller than the target value. On the other hand, if the mold release force is less than the second setting value (YES at step S14), the molding product is separated from the mold. Therefore, at step S15, the position control is performed instead of the mold release force control.

While the mold release force is used in this embodiment, the position of the ejection member 70 may alternatively be used to determine whether to switch from the mold release force control to the position control. When the ejection member 70 is at a predetermined position or is positioned backward relative to the predetermined position, the molding product is adhering to the mold. Therefore, the mold release force control continues to be performed. On the other hand, when the ejection member 70 is positioned forward relative to the predetermined position, the molding product is separated from the mold and the mold release force is hardly generated. Therefore, the position control is performed instead of the mold release force control. Both the position of the ejection member 70 and the mold release force may be used to determine whether to switch from the position control to the mold release force control.

Thereafter, the ejecting operation is completed by the position of the ejection member 70 reaching the ejection completion position. Then, the controller 90 drives the ejector motor 66 to return the ejection member 70 to the ejection start position.

While both the position control and the pressure control are performed in this embodiment, the pressure control alone may be performed as the control of the ejecting operation. The pressure control may be performed from the start of ejection. Furthermore, the pressure control may be performed until the completion of ejection.

All examples and conditional language provided herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority or inferiority of the invention. Although one or more embodiments of the present invention have been described in detail, it should be understood that the various changes, substitutions, and alterations could be made hereto without departing from the spirit and scope of the invention.

For example, the injection molding machine 10 of the above-described embodiments, which is a horizontal type where a mold unit is opened and closed in horizontal directions, may alternatively be a vertical type where a mold unit is opened and closed in vertical directions. In this case, the ejector unit 50 may be provided on a stationary platen and may be used to eject a molding product from a stationary mold.

Furthermore, while the ejector unit 50 of the above-described embodiments includes the ejector toggle mechanism 60 as a transmission mechanism to transmit the force of a drive source to the ejector movable platen 52, the transmission mechanism is not limited to a particular configuration. Examples of transmission mechanisms that convert an input to an output that corresponds to the distance between a support provided on the movable platen 13 and the ejector movable platen 52 and transmit the output (converted input) to the ejector movable platen 52 include a crank mechanism. Furthermore, the transmission mechanism may be omitted, and, for example, a hydro pneumatic cylinder may be provided between a support provided on the movable platen 13 and the ejector movable platen 52 so as to cause the ejector movable platen 52 to move toward and away from the support with the pressing force of the hydro pneumatic cylinder. It is possible to determine the state of mold release with a mold release force sensor.

Furthermore, while the ejector unit 50 of the above-described embodiments includes an electric motor as a drive source to cause the ejector toggle mechanism 60 to operate, the drive source is not limited to a particular kind. For example, a hydraulic motor may be used as a drive source. Furthermore, a hydraulic cylinder such as a hydro pneumatic cylinder may also be used.

Furthermore, while the ejector movable platen 52 of the above-described embodiments is provided at a position more distant from the movable mold 33 than is the ejector toggle support 51, the ejector movable platen 52 may alternatively be provided at a position closer to the movable mold 33 than is the ejector toggle support 51. In this case, unlike the above-described embodiments, with the start of ejection, the distance between the ejector toggle support 51 and the ejector movable platen 52 increases and the angle θ between the centerline of each ejector toggle arm 61 and the centerline of the corresponding first ejector toggle lever 62 increases. Accordingly, the ejection speed is higher because of a smaller ejection force at the start of ejection than in the above-described embodiments.

Furthermore, while the ejection member 70 of the above-described embodiments is connected to the molding product ejecting member provided in the movable mold 33, the ejection member 70 may alternatively not be connected to the molding product ejecting member. The molding product ejecting member may move forward when the ejection member 70 further moves forward after moving forward to come into contact with the molding product ejecting member. In this case, the molding product ejecting member is caused to move backward by the urging force of return springs provided in the movable mold 33.

Furthermore, of the ejection member 70 of the above-described embodiments, the ejector plate 71 and the ejector rod 68 may be used as a molding product ejecting member provided in the movable mold 33. In this case, the ejection member 70 is composed of the ejection tie bars 72 alone.

What is claimed is:

1. An injection molding machine, comprising:
   an ejector unit configured to eject a molding product from a mold;
   a mold release force sensor configured to detect a force to release the molding product from the mold; and
   a monitoring part configured to monitor a result of detection by the mold release force sensor,
   wherein the ejector unit includes
      a support provided on a platen to which the mold is attached;
      a slidable base configured to slide relative to the support;
      an ejection member configured to move together with the slidable base; and
      an adjustment mechanism configured to adjust a position of the ejection member relative to the slidable base, and
   wherein the monitoring part is configured to control the adjustment mechanism based on a result of monitoring the result of the detection by the mold release force sensor.

2. The injection molding machine as claimed in claim 1, wherein the ejector unit further includes
   a transmission mechanism supported by the support and configured to convert an input into an output corresponding to a distance between the support and the slidable base and transmit the output to the slidable base; and a drive source configured to cause the transmission mechanism to operate.

3. The injection molding machine as claimed in claim 1, further comprising:

a display part configured to display the result of the detection by the mold release force sensor.

4. The injection molding machine as claimed in claim 1, wherein the monitoring part is configured to control at least a part of an ejecting operation of the ejector unit based on the result of the detection by the mold release force sensor.

* * * * *